(12) United States Patent
Patro

(10) Patent No.: US 11,689,664 B1
(45) Date of Patent: Jun. 27, 2023

(54) AUTOMATIC CALL DISTRIBUTION SYSTEM, METHOD, AND COMPUTER PROGRAM HAVING MULTI-SKILL BASED ROUTING

(71) Applicant: Amdocs Development Limited, Limassol (CY)

(72) Inventor: Debabrata Patro, Pune (IN)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 17/141,033

(22) Filed: Jan. 4, 2021

(51) Int. Cl.
*H04M 3/523* (2006.01)
*H04M 3/51* (2006.01)

(52) U.S. Cl.
CPC .................. *H04M 3/5233* (2013.01)

(58) Field of Classification Search
None
See application file for complete search history.

(56) References Cited

U.S. PATENT DOCUMENTS

| | | | |
|---|---|---|---|
| 5,206,903 A | 4/1993 | Kohler et al. | |
| 5,825,869 A | 10/1998 | Brooks et al. | |
| 6,188,673 B1* | 2/2001 | Bauer | H04M 3/523 370/252 |
| 6,665,395 B1 | 12/2003 | Busey et al. | |
| 2010/0111287 A1* | 5/2010 | Xie | H04M 3/5232 379/265.13 |
| 2012/0183131 A1* | 7/2012 | Kohler | H04M 3/5238 379/265.12 |
| 2016/0182720 A1* | 6/2016 | Kaiser | G06Q 30/0264 379/265.09 |

FOREIGN PATENT DOCUMENTS

WO 2000027102 A1 5/2000

OTHER PUBLICATIONS ilanguages.org, "Multilingual People," ilanguages.org, 2018, 3 pages, retrieved from http://ilanguages.org/bilingual.php.
Wikipedia, "Visual Interactive Voice Response," Wikipedia, 2020, 2 pages, retrieved from https://en.wikipedia.org/wiki/Visual_Interactive_Voice_Response.

* cited by examiner

*Primary Examiner* — Harry S Hong
(74) *Attorney, Agent, or Firm* — Zilka-Kotab, P.C.

(57) ABSTRACT

As described herein, an automated call distribution system, method, and computer program are provided that use multi-skill based routing. An opportunity to make customer service-related contact with a customer is detected. A plurality of skills required to handle the customer service-related contact is determined, where each required skill is defined as a skill type and one or more corresponding skill values. A plurality of skills of each customer service agent among one or more available customer service agents is determined. The customer service-related contact is managed based on the plurality of skills required to handle the customer service-related contact and the plurality of skills of each customer service agent among the one or more available customer service agents.

18 Claims, 5 Drawing Sheets

AUTOMATIC CALL DISTRIBUTION SYSTEM, METHOD, AND COMPUTER PROGRAM HAVING MULTI-SKILL BASED ROUTING

FIELD OF THE INVENTION

The present invention relates to techniques for automatic call distribution.

BACKGROUND

An automated call distribution system, commonly known as automatic call distributor (ACD), is a telephony device or software system employed by business entities that answers and distributes incoming calls to a specific agent or a group of agents within an organization. This is a foundational element for practically all call centers. Skills-based routing (SBR), or Skills-based call routing, is a call-assignment strategy used in call centers to assign incoming calls to the most suitable agent, instead of simply choosing the next available agent. It is an enhancement to the ACD systems found in most call centers. The need for skills-based routing has arisen as call centers have become larger and deal with a wider variety of call types. Before SBR, agents answering calls were generally able to be assigned to only one queue taking one type of call. This meant that agents who could deal with a range of call types had to be manually reassigned to different queues at different times of the day to make the best use of their skills, or face being exposed to a wide variety of calls for which they were not trained.

With SBR, the skills needed for a particular call are often assessed by the dialed telephone number and the calling number or caller's identity, as well as choices made in any associated Interactive Voice Response (IVR) system (such as the language selected by the caller or the specific submenu item selected by the caller). Given this assessment, a skills-based routing system then attempts to match the call to a suitable agent.

The current state of art assumes that the "skill" required to handle the caller's request is 1, whereas the agent may have 1 or more skills. For example, on the IVR menu of any call center that supports multiple languages of interaction, one of the first questions asked is to select the preferred language and subsequently, all the IVR prompts are in that selected language and more importantly, the call is routed to an agent who speaks that language and is qualified to handle the specific transaction requested (e.g. one may be wanting to dispute a bill and hence the call will be routed to someone who knows how to handle charge disputes and handle a potentially angry customer).

Thus, the basic assumption at the heart of current state of the art SBR about the cardinality of the requested "skills" versus agent skills being 1:m is demonstratively and factually incorrect. For example, while the IVR menu language selection options always asks to choose one language, it ignores the fact that more than half of the world population is at least bilingual.

A major negative side effect of this flawed assumption that the "skill" required to handle a call is one (e.g. Language selected in the IVR is "Tagalog"), such that if the queue of the agents that have that skills are full (e.g. agents that speak at least Tagalog is full),\ then caller has to wait till the time at least one agent with that specific skill becomes free to have the call routed to her. While the caller is waiting on the line to have an agent who can speak in Tagalog gets free, it could very well be possible that there are other agents idling/waiting for calls who can speak in other languages such as English or Spanish. Given the fact that the world population is almost 60% at least bilingual, each caller to the call center is more likely than not to be able to converse in two or more languages. So, in this example, the caller might prefer Tagalog as the language, but it is quite possible that s/he is comfortable speaking in English or Spanish and will be unnecessarily waiting for a Tagalog speaking agent to be free while simultaneously, the English or Spanish speaking agents are idling/waiting for callers. It is clearly a case of wastage of time of the caller and the agents, as well as increases the handling time of calls and wastes communication resources.

There is thus a need for addressing these and/or other issues associated with the prior art.

SUMMARY

As described herein, an automated call distribution system, method, and computer program are provided that use multi-skill based routing. An opportunity to make customer service-related contact with a customer is detected. A plurality of skills required to handle the customer service-related contact is determined, wherein each required skill is defined as a skill type and one or more corresponding skill values. A plurality of skills of each customer service agent among one or more available customer service agents is determined. The customer service-related contact is managed based on the plurality of skills required to handle the customer service-related contact and the plurality of skills of each customer service agent among the one or more available customer service agents.

DETAILED DESCRIPTION

Figure 1:
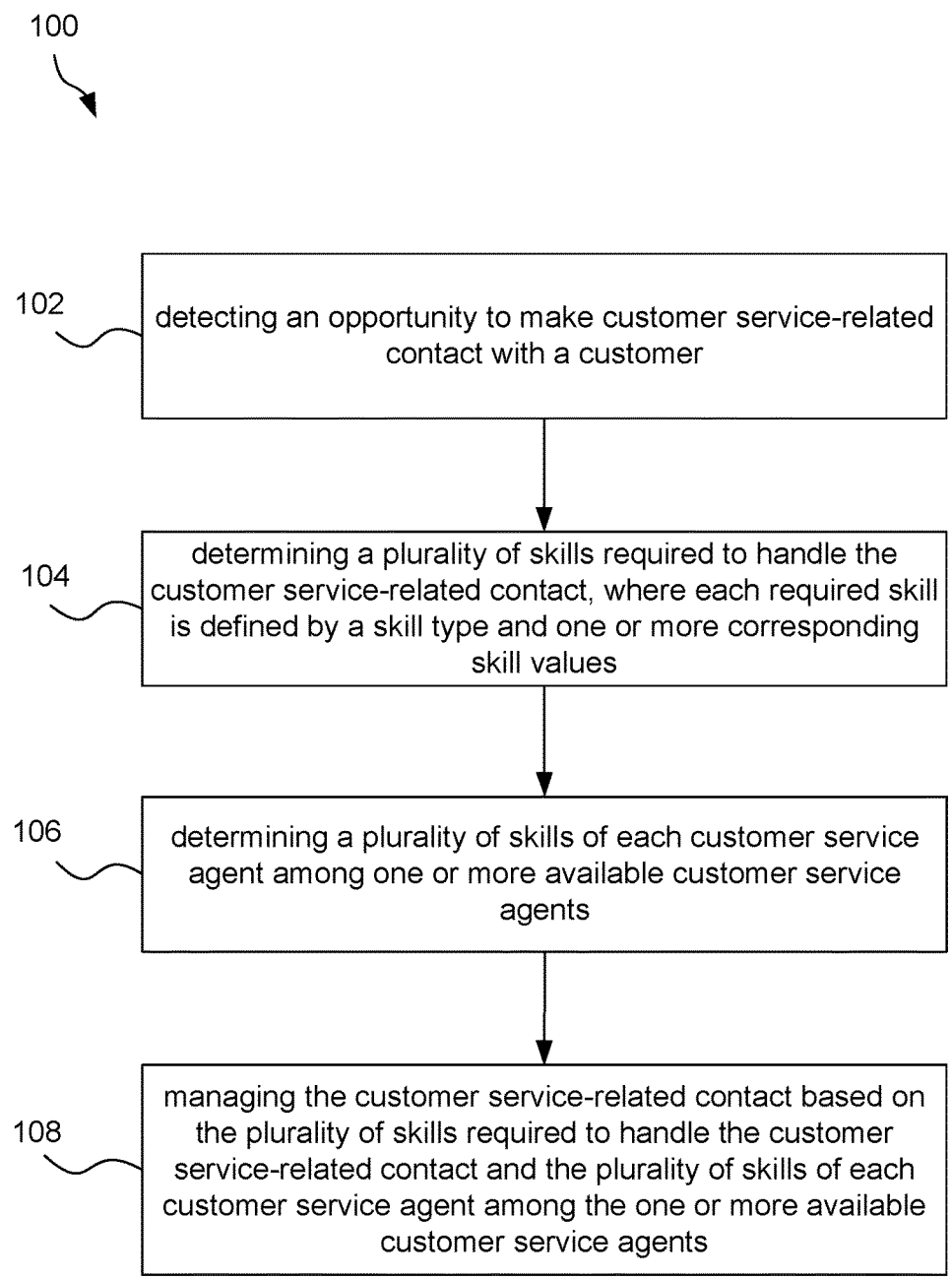
FIG. 1 illustrates a method that manages opportunities to make customer service-related contact with a customer based on multiple required skills, in accordance with one embodiment.

FIG. 1 illustrates a method 100 that manages opportunities to make customer service-related contact with a customer based on multiple required skills, in accordance with one embodiment. The method 100 may be performed by any computer system, such as those described below with reference to FIGS. 4 and/or 5. In one embodiment, the method 100 may be performed by an automated call distribution system, as described in more detail with reference to FIG. 2.

In operation 102, an opportunity to make customer service-related contact with a customer is detected. In one embodiment, the customer service-related contact may a communication session to be established with the customer. In this case, the opportunity to make the customer service-related contact with the customer may be detected by receiving an incoming customer service communication initiated by the customer.

The incoming customer service communication refers to a customer service-related communication of any type that is incoming to the system performing method 100. The customer service communication may be initiated by a customer or other user, for example. Further, the customer service communication may be directed towards a customer service call center or other communication system interfacing customer service agents (e.g. real people or robots) capable of handling customer service communications.

To this end, the customer service communication may be detected upon receipt thereof by the system performing method 100. In one embodiment, the customer service communication may be a telephone call. In another embodiment, the customer service communication may be an online chat.

While various embodiments are described herein with reference to an incoming customer service communication, it should be noted that other types of customer service-related contact are also applicable to the present method 100 and other embodiments described herein. For example, where the customer service-related contact is a communication session to be established with the customer, the opportunity to make the customer service-related contact with the customer may be detected by identifying an outgoing customer service communication to be sent to the customer. In another embodiment, the customer service-related contact may be an in-person meeting with the customer, where for example the opportunity to make the customer service-related contact with the customer may be detected based on a request for the in-person meeting.

In operation 104, a plurality of skills required to handle the customer service-related contact is determined, where each required skill is defined as a skill type and one or more corresponding skill values. The skills may be defined as parameters, characteristics, features, or any other requirements applicable to a customer service agent. As described below, these skills required to handle the customer service-related contact may accordingly be used to select a customer service agent to handle the customer service-related contact or to otherwise manage the customer service-related contact.

As noted above, each skill required to handle the customer service-related contact is defined by skill type and at least one corresponding skill value. Optionally, the skill types indicated as required to handle the customer service-related contact may include a language, a subscription type, and/or a device type. As another possible option, the skill types indicated as required to handle the customer service-related contact may include a reason the customer initiated the incoming customer service communication, and/or any other possible type of skill. For this option, the reason may be a prediction with a specified degree of probability.

As mentioned above, each skill required to handle the customer service-related contact may be defined by at least one skill value specified for a particular skill type. Thus, one or more of the skills required to handle the customer service-related contact may be indicated (e.g. defined) by a particular skill type and a plurality of corresponding skill values for that particular skill type. In one embodiment, the skill values may be listed, in conjunction with the skill type, by ranked preference. This may allow multiple skills of a same skill type to be indicated, in order of preference, as required for handling the customer service-related contact. Just by way of example, for the skill type "language," multiple different skill values (i.e. languages, such as English, Spanish, etc.) many be listed in order of preference.

In one embodiment, the skills required to handle the customer service-related contact may be determined from preferences received from the customer when initiating the incoming customer service communication (i.e. a party to the incoming customer service communication). For example, the one or more of the preferences may be received from the customer during the initiation of the incoming customer service communication (e.g. via a voice menu selection process, a user graphical user interface, etc.). As another example, the one or more of the preferences may be received from the customer during an account creation process (e.g. performed prior to the initiation of the incoming customer service communication) and which may be stored in association with the account of the customer.

In operation 106, a plurality of skills of each customer service agent among one or more available customer service agents is determined. In one embodiment, the one or more available customer service agents may include customer service agents currently available to handle the customer service-related contact. In another embodiment, the one or more available customer service agents may include one or more customer service agents predicted to be available to handle the customer service-related contact within a specified period of time.

The skills of each customer service agent may be predefined in storage in association with an identifier of the customer service agent. For example, the skills of a customer service agent may indicate languages spoken, knowledge of particular subscription types, knowledge of particular device types, knowledge related to possible reasons for customer initiated customer service communications, etc. Thus, the skills of each customer service agent may correlate with the potential skill types capable of being required by customer service-related contacts.

In operation 108, the customer service-related contact is managed based on the plurality of skills required to handle the customer service-related contact and the plurality of skills of each customer service agent among the one or more available customer service agents. The customer service-related contact may be managed based on predefined criteria (e.g. policies, rules, etc.) applied to the skills required to handle the customer service-related contact and the skills of each of the available customer service agents. For example, a volume of upcoming customer service-related contacts may be predicted, a plurality of skills required to handle the upcoming customer service-related contacts may be predicted, and further the customer service-related contact may be managed based on the predicted volume the predicted skills required to handle the upcoming customer service-related contacts.

In another embodiment, the v may be managed by selecting a customer service agent among the one or more available customer service agents and assigning the customer service-related contact to the selected customer service agent for handling the customer service-related contact. Assigning the customer service-related contact to the selected customer service agent may include initiating a communication session between the customer and the selected customer service agent for the customer service-related contact, for example. In another embodiment, the customer service-related contact may be managed by selecting a queue associated with a group of customer service agents and routing the incoming customer service communication or other type of customer-service contact to be made to the selected queue.

In this way, the method 100 may enable the required skills for the customer service-related contact to be specified as multiple rather than just one skill, such that the multiple skills can be matched with the skills of available agents and/or the skill associated with a particular agent queue, for skill based routing and automatic distribution of the customer service-related contact (e.g. as a task) to the relevant agent or queue.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
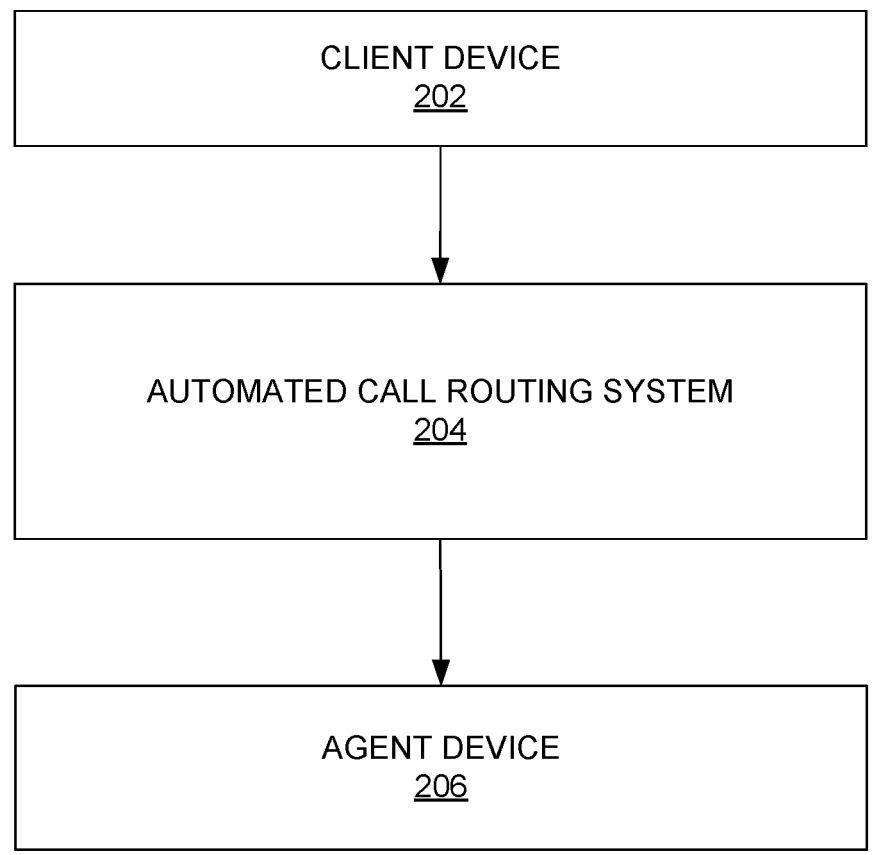
FIG. 2 illustrates a system flow diagram for an automated call distribution system that uses multi-skill based routing, in accordance with one embodiment.

FIG. 2 illustrates a system flow 200 involving an automated call distribution system that uses multi-skill based routing, in accordance with one embodiment. As an option, the system flow 200 may be implemented in the context of the details of the previous figure and/or any subsequent figure(s). Of course, however, the system flow 200 may be implemented in the context of any desired environment. Further, the aforementioned definitions may equally apply to the description below. Again, while the embodiments described herein refer to customer service-related contact as a call, it should be noted that any customer service-based system may employ the same functionality for making any type of customer service-related contact with a customer.

As shown, an automated call routing system 204 interfaces a client device 202 and an agent device 206. The automated call routing system 204 may be a component of a call center system (not shown), but in any case, is used to provide multi-skill based routing of incoming customer service calls to customer service agents. While only one client device 202 and one agent device 206 are shown, it should be noted that this is simply to illustrate the system flow 200. The automated call routing system 204 can be implemented to interface any number of different client and agent devices.

The client device 202 can be any device capable of being used by a user to initiate a customer service call. For example, the client device 202 may be a landline telephone, a mobile phone, a tablet, a laptop computer, etc. Additionally, the agent device 206 may be any device capable of being used by a customer service agent to connect to the customer service call, such as a computer system, telephone system, etc. To this end, the automated call routing system 204 may be any computer system configured to communicate with the different types of client and agent devices, and accordingly to provide multi-skill based routing of various types of incoming customer service calls, such as telephone calls, online chats, video calls, etc.

In use, the automated call routing system 204 detects a customer service communication incoming from the client device 206. The automated call routing system 204 then determines a plurality of skills required to handle the incoming customer service communication, as well as a plurality of skills of each customer service agent among one or more available customer service agents. The automated call routing system 204 further manages the incoming customer service communication based on the plurality of skills required to handle the incoming customer service communication and the plurality of skills of each customer service agent among the one or more available customer service agents, such as by selecting a customer service agent using the agent device 206 to handle the incoming customer service communication and further connecting the incoming customer service communication with the agent device 206.

Figure 3:
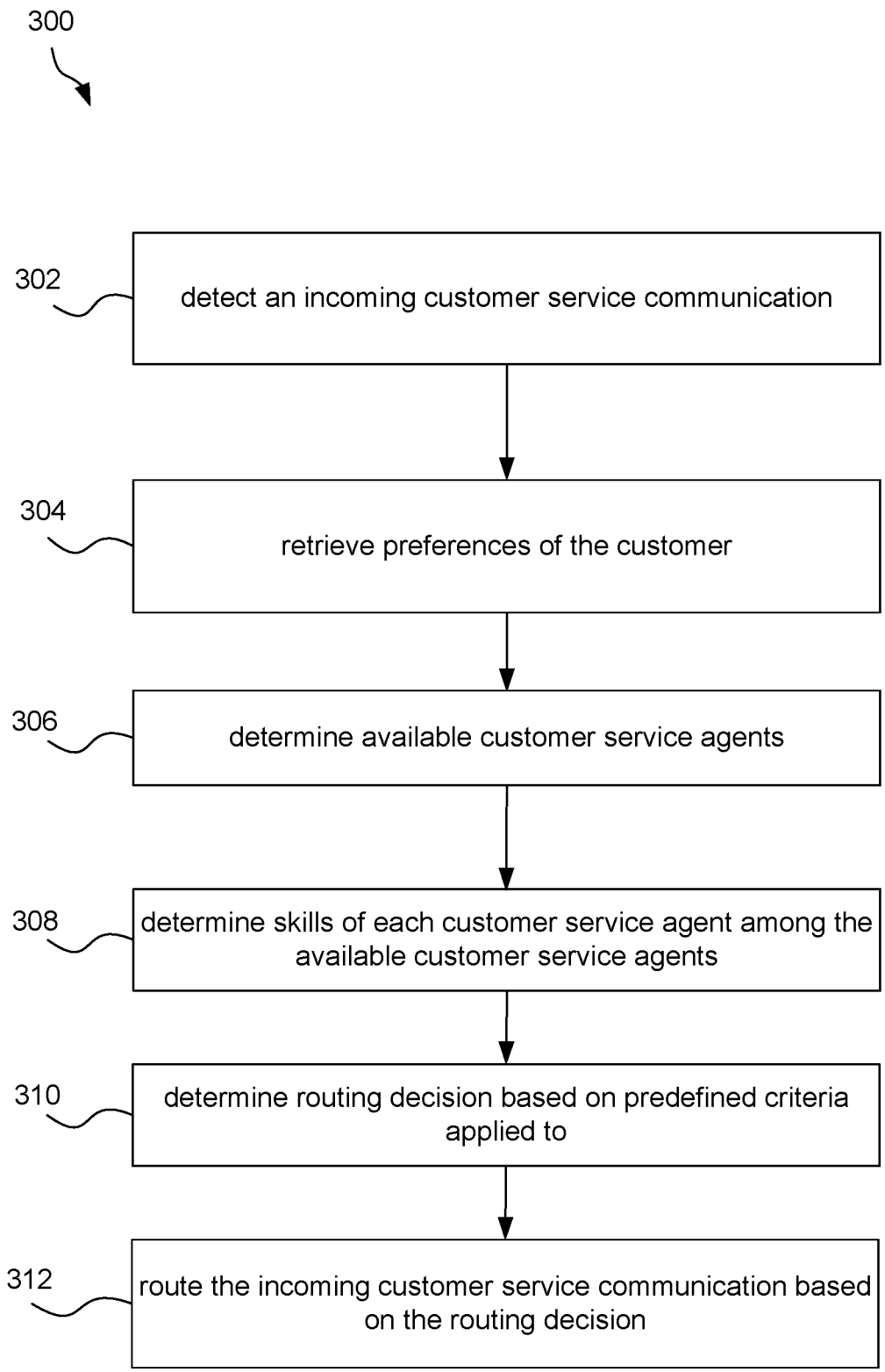
FIG. 3 illustrates a method of an automated call distribution system that uses multi-skill based routing, in accordance with one embodiment.

FIG. 3 illustrates a method 300 of an automated call distribution system that uses multi-skill based routing, in accordance with one embodiment. As an option, the method 300 may be carried out the context of the details of the previous figure and/or any subsequent figure(s). Of course, however, the method 300 may be carried out in the context of any desired environment. Further, the aforementioned definitions may equally apply to the description below.

In operation 302, an incoming customer service communication is detected. In operation 304, preferences of the customer are determined. In the context of the present embodiment, the preferences specify the skills required to handle the incoming customer service communication. In operation 306, available customer service agents are determined. In operation 308, skills of each of the available customer service agents are determined.

Further, in operation 310, a routing decision determined based on predefined criteria applied to the skills required to handle the incoming customer service communication and the skills of each of the available customer service agents. In operation 312, the incoming customer service communication is routed based on the routing decision. For example, the incoming customer service communication may be routed to one of the available customer service agents. As another example, the incoming customer service communication may be routed to a queue assigned to one or more available customer service agents for future handling by one of those available customer service agents.

Exemplary Embodiments

Embodiments described herein provide skill based routing where the required skills to handle an incoming communication are multiple and are matched with agent skills which are also multiple. The required skills may have two parameters—skill type and the corresponding skill value(s). For example, skill type can be language, subscription type, etc. Each of skill type can have one or multiple values that the user can select or that can be assigned. For example, in the interactive voice recognition (IVR) language selection menu, instead of saying "Select 1 for English, 2 for Tagalog and 3 for Spanish", the menu can say "Select your languages in order of preference". If a customer can speak Tagalog and English & prefers Tagalog over English, s/he can give the input as 21 and if someone can speak only English, s/he can give the input as 1.

There are other parameters ("skills") that can be used for skill based routing. For a business entity with the focus on bundling and multi-play offerings, customers are having multiple subscriptions and when they are contacting the call center, the subscription/product can be another example based on which call routing can be done. The third example is based on the output from a system like Proactive Care which predicts the reason why the user is calling which is provided in terms of a probability. Instead of routing based on the top most/highest probability, the system can do routing to the $2^{nd}$ likely item if no agent with the skills needed to handle the highest probability issue is free to handle the call and the likely queuing time is higher than a threshold.

The skill based routing system may use this m:n mapping of the required skills to the available skills and the current agent availability situation as well as predictive data about the agent availability (e.g. based on Average Handle Time (AHT), predicting when a currently busy agent will become free) as well expected upcoming call volumes and predicted required skill mix to route the call to either a free agent or to a queue with the least predicted waiting time or any other parameter that the call center operator decides as the routing criteria. To continue with the example given above, if all the agents that can speak Tagalog are busy and there is a queue of say 10 callers waiting in the "Tagalog" queue, the call may be routed to an agent who speaks "English".

With advent of technologies such as "Visual IVR," the input from the customer can be captured using a visual interface. A third way of capturing the user input/preference is through voice recognition whereby the customer can be prompted to speak out the preferences in the sequence they prefer (e.g. "Taglog and English", "Fiber and TV", etc.). Using a speech recognition engine, the system can decipher the information and use the ordered list of skills required for routing of the communication.

This may also require changes in the customer relationship management (CRM) or other call center applications to capture preferred languages of customers/contacts rather than just one language and similar other multi-value attributes. The information can be gathered at the time of service activation, as a part of self-service or based on the inputs given during specific interactions such as when calling the call center or interacting through the chat service.

With the information stored about user preferences, the system can automatically do the routing without user input in the IVR by identifying the user preferences based on the caller line identification and use this information for routing for both inbound and outbound interactions with the user.

In prior art techniques, the outdialers look for available agents and then do the auto outdialing based on their skills. Enabling handling of multi-value skill types will increase the pool of agents that can handle the outgoing communications and will potentially increase the agent utilization and reduce idle time/waiting times.

While some of the above given examples are for voice calls, the same can be extended to other types of communication. Further, embodiments are not limited to voice interaction but can include interaction with live person chats where the interface can include selection visually (or pull from the data already stored in the system). In fact, embodiments can be extended to interactive communication with the provider's representative (agent) with the customers using any communication channel including when assigning technicians for on-premise services (e.g. send a Spanish speaking technician or Chinese speaking installer to a person's residence/office as necessary).

Figure 4:
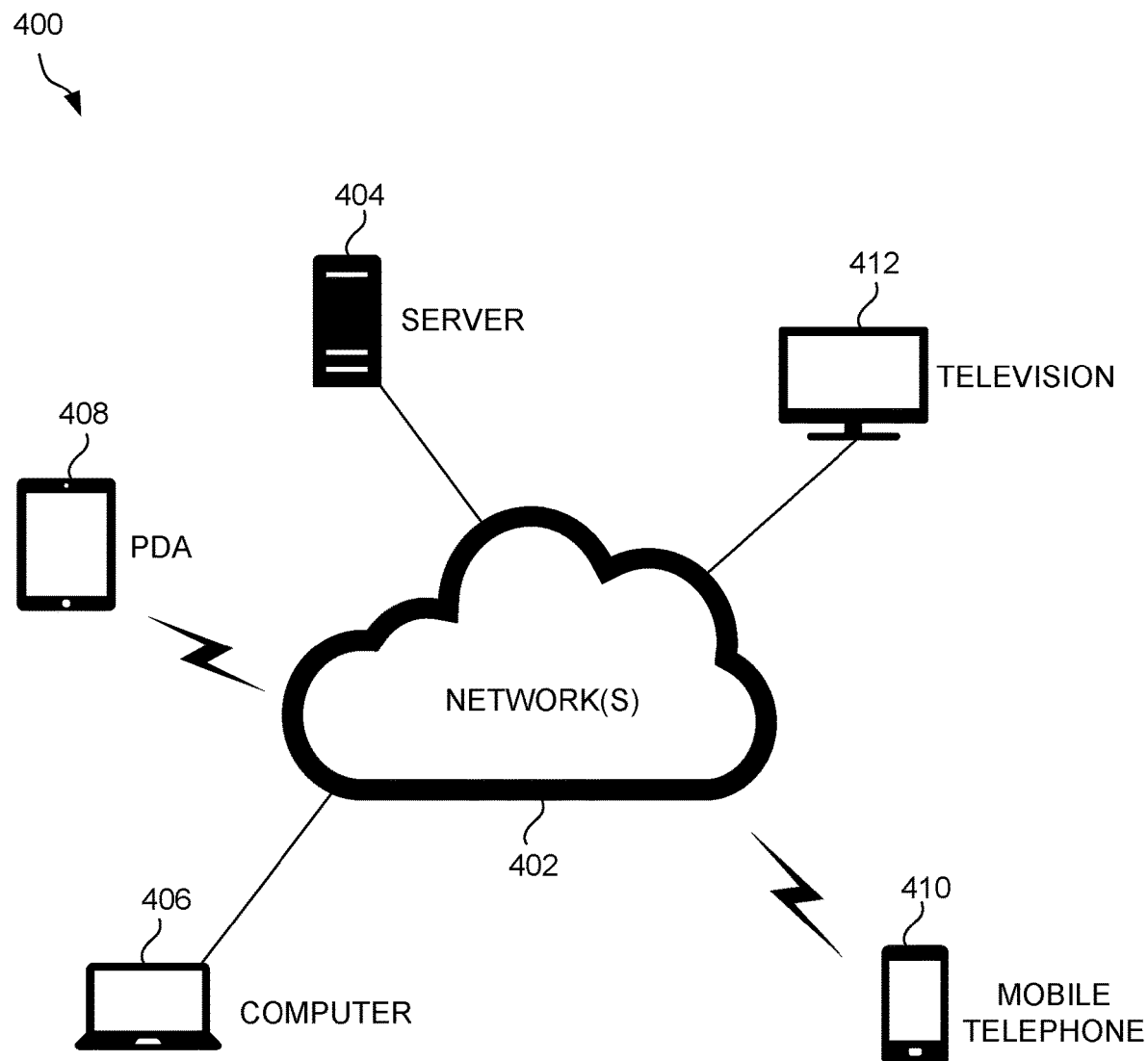
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
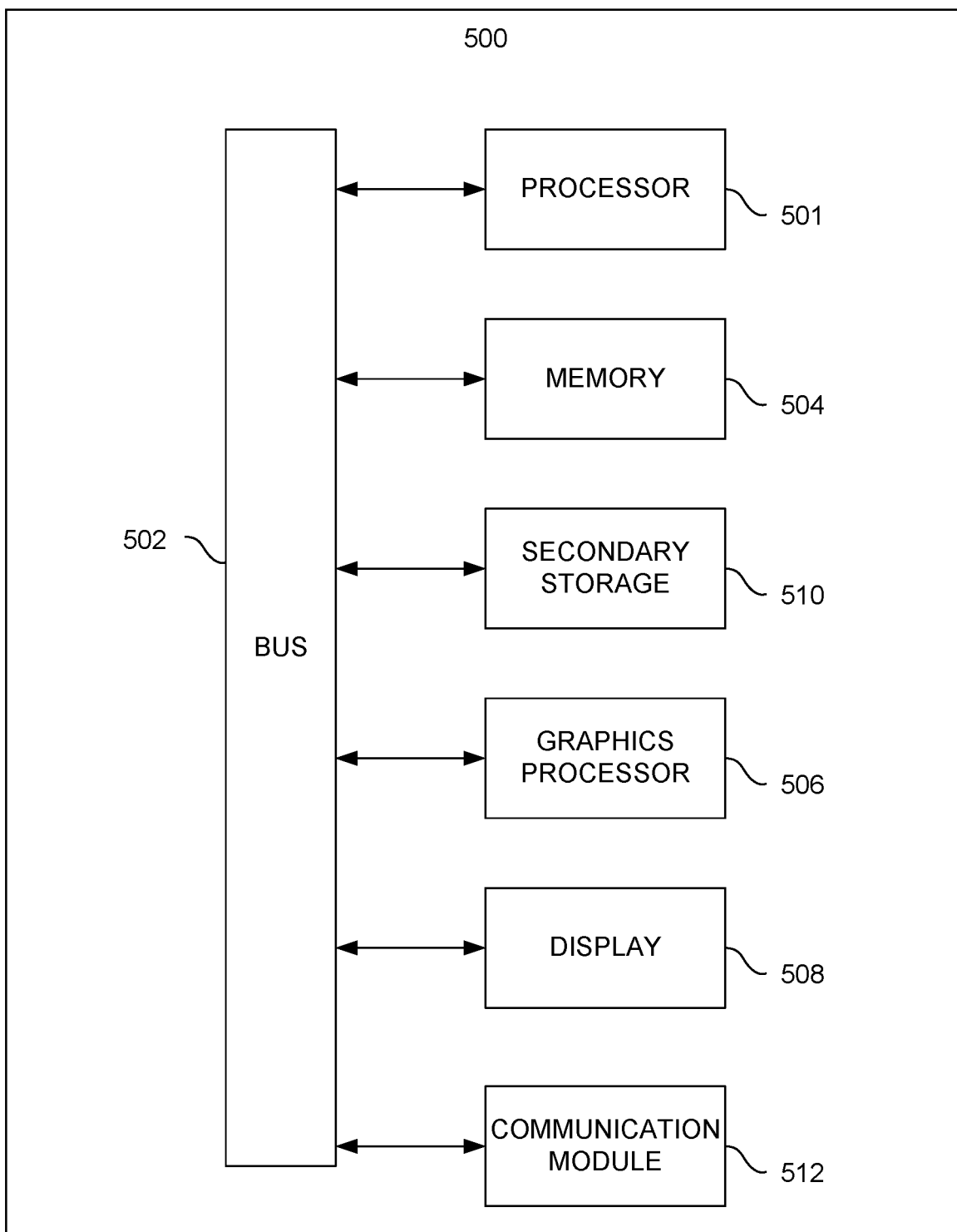
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   detecting an opportunity to make customer service-related contact with a customer;
   determining a plurality of skills required to handle the customer service-related contact, wherein each skill of the plurality of skills is defined as a skill type and one or more corresponding skill values;
   determining a plurality of skills of each customer service agent among one or more available customer service agents, wherein the plurality of skills of each customer service agent indicate knowledge of the customer service agent including languages spoken by the customer service agent, knowledge of the customer service agent with regard to particular subscription types, knowledge of the customer service agent with regard to particular device types, and knowledge of the customer service agent with regard to possible reasons for the opportunity to make the customer service-related contact with the customer; and
   managing the customer service-related contact based on the plurality of skills required to handle the customer service-related contact and the plurality of skills of each customer service agent among the one or more available customer service agents, including:
      selecting a customer service agent among the one or more available customer service agents which has the plurality of skills that satisfy plurality of skills required to handle the customer service-related contact, and
      initiating a communication session between the customer and the selected customer service agent.

2. The non-transitory computer readable medium of claim 1, wherein the customer service-related contact is a communication session to be established with the customer, and wherein the opportunity to make the customer service-related contact with the customer is detected by one of:
   receiving an incoming customer service communication initiated by the customer, or identifying an outgoing customer service communication to be sent to the customer.

3. The non-transitory computer readable medium of claim 1, wherein the customer service-related contact is an in-person meeting with the customer, and wherein the opportunity to make the customer service-related contact with the customer is detected based on a request for the in-person meeting.

4. The non-transitory computer readable medium of claim 1, wherein the plurality of skills required to handle the customer service-related contact are determined from preferences received from the customer.

5. The non-transitory computer readable medium of claim 4, wherein one or more of the preferences are received during an initiation of an incoming customer service communication.

6. The non-transitory computer readable medium of claim 4, wherein one or more of the preferences are received from the customer during an account creation process and are stored in association with the account of the customer.

7. The non-transitory computer readable medium of claim 1, wherein the skill types indicated by the plurality of skills required to handle the customer service-related contact include a language.

8. The non-transitory computer readable medium of claim 7, wherein the skill types indicated by the plurality of skills required to handle the customer service-related contact include at least one of a subscription type or a device type.

9. The non-transitory computer readable medium of claim 7, wherein the skill types indicated by the plurality of skills required to handle the customer service-related contact include a reason the customer initiated an incoming customer service communication.

10. The non-transitory computer readable medium of claim 9, wherein the reason is a prediction with a specified degree of probability.

11. The non-transitory computer readable medium of claim 7, wherein the at least one corresponding skill value for at least one of the skill types includes a plurality of corresponding skill values listed by ranking.

12. The non-transitory computer readable medium of claim 1, wherein the one or more available customer service agents include one or more customer service agents currently available to handle the customer service-related contact.

13. The non-transitory computer readable medium of claim 1, wherein the one or more available customer service agents include one or more customer service agents predicted to be available to handle the customer service-related contact within a specified period of time.

14. The non-transitory computer readable medium of claim 1, wherein the customer service-related contact is managed based on predefined criteria applied to the plurality of skills required to handle the customer service-related contact and the plurality of skills of each customer service agent among the one or more available customer service agents.

15. The non-transitory computer readable medium of claim 1, further comprising:
predicting a volume of upcoming customer service-related contacts; and
predicting a plurality of skills required to handle the upcoming customer service-related contacts;
wherein the customer service-related contact is further managed based on the predicted volume of upcoming customer service-related contacts and the predicted plurality of skills required to handle the upcoming customer service-related contacts.

16. A method, comprising:
detecting an opportunity to make customer service-related contact with a customer;
determining a plurality of skills required to handle the customer service-related contact, wherein each skill of the plurality of skills is defined as a skill type and one or more corresponding skill values;
determining a plurality of skills of each customer service agent among one or more available customer service agents, wherein the plurality of skills of each customer service agent indicate knowledge of the customer service agent including languages spoken by the customer service agent, knowledge of the customer service agent with regard to particular subscription types, knowledge of the customer service agent with regard to particular device types, and knowledge of the customer service agent with regard to possible reasons for the opportunity to make the customer service-related contact with the customer; and
managing the customer service-related contact based on the plurality of skills required to handle the customer service-related contact and the plurality of skills of each customer service agent among the one or more available customer service agents, including:
selecting a customer service agent among the one or more available customer service agents which has the plurality of skills that satisfy plurality of skills required to handle the customer service-related contact, and
initiating a communication session between the customer and the selected customer service agent.

17. A system, comprising:
a non-transitory memory storing instructions; and
one or more processors in communication with the non-transitory memory that execute the instructions to perform a method comprising:
detecting an opportunity to make customer service-related contact with a customer;
determining a plurality of skills required to handle the customer service-related contact, wherein each skill of the plurality of skills is defined as a skill type and one or more corresponding skill values;
determining a plurality of skills of each customer service agent among one or more available customer service agents, wherein the plurality of skills of each customer service agent indicate knowledge of the customer service agent including languages spoken by the customer service agent, knowledge of the customer service agent with regard to particular subscription types, knowledge of the customer service agent with regard to particular device types, and knowledge of the customer service agent with regard to possible reasons for the opportunity to make the customer service-related contact with the customer; and
managing the customer service-related contact based on the plurality of skills required to handle the customer service-related contact and the plurality of skills of each customer service agent among the one or more available customer service agents, including:
selecting a customer service agent among the one or more available customer service agents which has the plurality of skills that satisfy plurality of skills required to handle the customer service-related contact, and
initiating a communication session between the customer and the selected customer service agent.

18. The non-transitory computer readable medium of claim 1, wherein the skills required to handle the customer service-related contact indicate a prediction of a plurality of possible reasons for the opportunity to make the customer service-related contact with the customer, wherein each possible reason of the plurality of possible reasons is predicted with a corresponding probability, and wherein when no available customer service agent exists having skills that satisfy the possible reason having a highest corresponding probability, then the customer service agent that is selected among the one or more available customer service agents is one having skills that satisfy the possible reason having a next highest corresponding probability.

* * * * *